Sept. 25, 1973 G. A. JEFFREYS 3,761,237
PROCESS FOR CONVERTING ORGANIC WASTE TO HUMUS
Filed Jan. 19, 1973 3 Sheets-Sheet 3
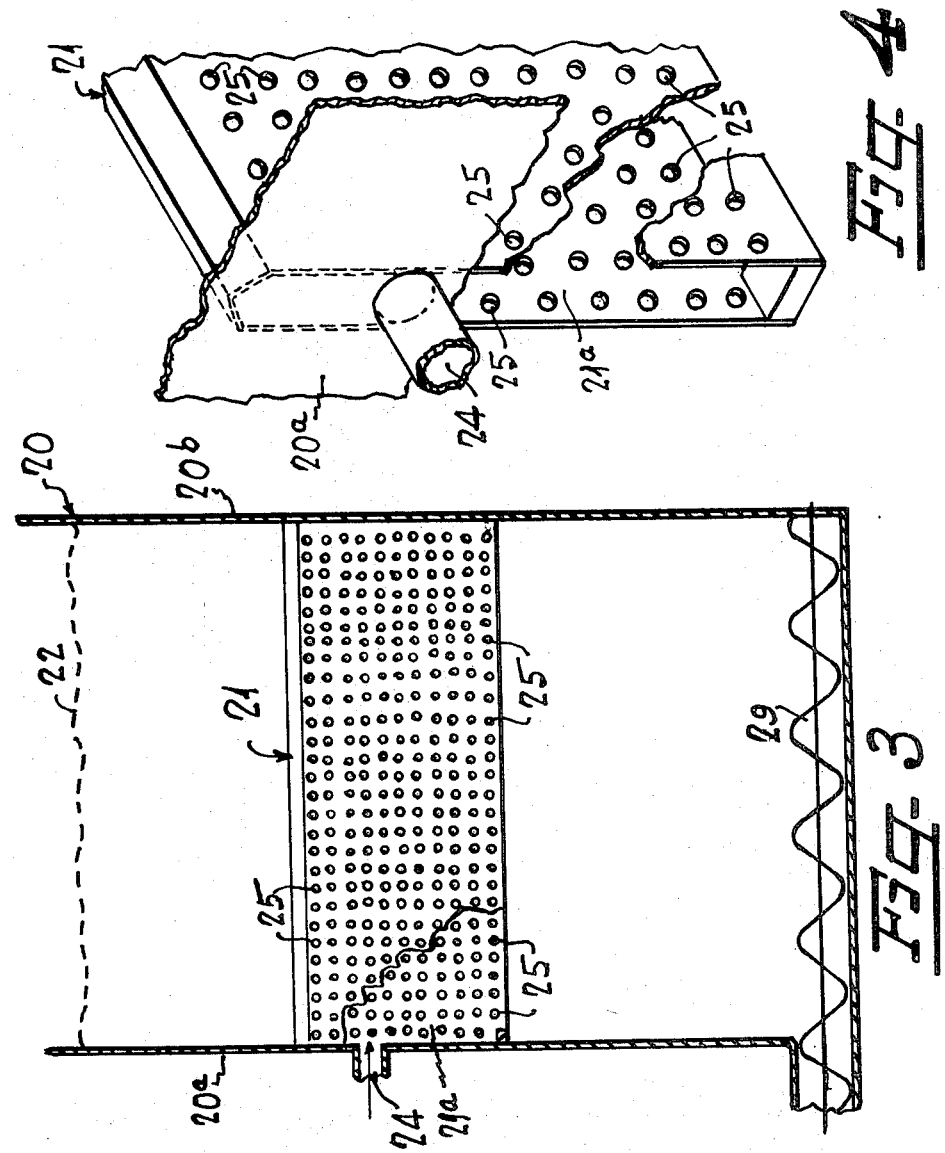

United States Patent Office 3,761,237
Patented Sept. 25, 1973

3,761,237
PROCESS FOR CONVERTING ORGANIC
WASTE TO HUMUS
George A. Jeffreys, 219 Valleydale Ave.,
Salem, Va. 24153
Continuation-in-part of abandoned application Ser. No. 91,319, Nov. 20, 1970. This application Jan. 19, 1973, Ser. No. 325,169
Int. Cl. C05f 11/08
U.S. Cl. 71—9                          5 Claims

ABSTRACT OF THE DISCLOSURE

A continuous process of composting organic waste material while maintaining a pH ranging between 6 and 8, a moisture content ranging between 40 and 70%, and a temperature maximum of not more than 65° C., the process consisting of the steps of (a) forming a centrally disposed submerged air space within and substantially interfacially surrounded by a stationary mass of said matarial, (b) maintaining equalized air pressure in the space concurrently with spraying said air therefrom at a uniform velocity into the mass jets uniformly distributed over said interface to thereby aerate the material, provide oxygen for aerobic compositing, and prevent a temperature rise above said maximum, (c) continuing the areation until most of the available nutrients for multiplying heat-producing thermophilic and mesophilic bacteria have been utilized to cause the temperature to fall substantially, and to a level which, when inoculated with beneficial soil cultuers consisting of Streptomyces, Azotobacter and Rhizobium and other beneficial soil organisms, the temperature of the humus will allow the cultures to multiply and become an integral part thereof, and (d) recyling a portion of the final stabilized humus of which the soil cultures have become an integral part to a point in the continuous process which will allow the cultures to grow to an even higher concentration.

This application is a continuation-in-part of my copending application Ser. No. 91,319, filed Nov. 20, 1970 and now abandoned. The invention relates to pollution control and more especially to the conversion of organic waste materials into humus within a shorter time and so as to contain beneficial substances not ordinarily present in commercial humus. Although not so limited, the invention is particularly useful to convert animal manure, sewage sludge, garbage and the like to soil conditioners.

The human and animal waste disposal problem has become progressively more critical during recent years. Although major efforts have been made by municipalities to purify and convert human wastes through the use of incinerators and sewage treatment, the processes employed have been inefficient, time-consuming and inadequate. The magnitude of the animal waste problem is apparent from the fact that its volume is approximately eleven times that of human waste. Moreover, further increases in the volume of animal waste is in prospect due to the continuing uptrend in cattle, pork and poultry inventories, and toward larger and more concentrated animal agricultural units.

Past efforts to effectively and safely dispose of animal wastes have met with very limited success since such wastes occur predominantly in rural areas where pollution laws and regulations are seldom adequate and often nonexistent, thereby leaving disposal to the discretion of each agricultural unit; consequently, most of the units have utilized the least expensive disposal methods.

Various methods of composting have been developed over the centuries; but only during recent years has any attempts been made to produce humus from wastes in a scientific manner on a commercial scale. So far as I am aware, none of the prior are disclosures purport to shorten the composting time by forming a centrally disposed air space within and interfacially surrounded by a stationary batch of waste material, and maintaining equalized air pressure in the space concurrently with spraying the air therefrom at uniform velocity into the material and in jets uniformly distributed over the interface.

Furthermore, the prior art disclosures do not purport to process the waste materials in such a way as to have a capacity to inoculate a composting mass with beneficial soil organisms which will grow to a relatively high concentration and become an integral part of a completed humus; or have a capacity to survive the compositing process and then grow to a still higher concentration when as a completed humus it is recycled to an earlier point in the process.

In accordance with the invention, a submerged air cell is centrally positioned within a stationary batch of material, the walls of the cell being provided with small perforations of uniform size and spacing. Air is forced by a blower into the cell which, in turn, equalizes the pressure prior to it being sprayed outwardly and into the material in jets. Moderate air pressure produces a very desirable diffusing or percolating effect within the material and to all parts thereof.

My improved aeration process is especially effective when employed in combination with the present composting process. Heretofore, submerged areation has been employed in combination with composting material continuously in motion (see Abson Pat. No. 3,314,765), but such process are not economically feasible for composting large volumes due to the excessive cost of power to keep the material in motion and the maintenance of the machinery employed.

In my Pat. No. 2,867,521, issued Jan. 6, 1969, I have described methods of composting in which the material is transferred serially from bin to bin. The material in each bin is aerated by punching vertical holes or channels through the material and then capping some of them and air is supplied to the holes from the bottom. This method has proved impractical. In a few hours, the air starts to channel due to shrinkage and uneven openings at the capped holes, thus allowing air or gas to escape. Also, the air flows laterally from the walls of the holes at a faster rate at some areas than at other causing poor distribution.

It is therefore an object of this invention to provide a fast method of converting organic waste, while in a stationary mass, into humus by using the above-described improved aeration steps.

Another object of this invention is to prevent pollution of streams and lakes by converting animal manures, garbage, sewage sludge and the like to dry odorless soil conditioners that can be safely transported long distances to replenish improverished soils.

It is another object of this invention to provide a process of producing a dry absorbent humus with antibiotic substances that will prevent diseases when used as a litter for farm animals. The principal source of many antibiotics is soil micro-organisms belonging to the family of Streptomycetaceae.

It is a further object of this invention to produce a humus which contains nitrogen-fixing bacteria as an integral part thereof. Nitrogen-fixing bacteria are of two classes: the genus Azotobacter which fixes nitrogen into humus or soil directly from the air, and the genus Rhizobium which develops nodules on legume plant roots that grow and fix nitrogen directly from the air for use by the plants. A double advantage is obtained by using both classes in that the humus would be good for legume crops due to Rhizobium bacteria, and good for nitrogen-consuming crops such as corn due to Azotobacter bacteria.

Yet another object of this invention is to provide a process such as described in the immediately preceding paragraphs which is not only simple and efficient, but also relatively inexpensive so as to be economically feasible for use by medium-sized animal agricultural units.

Some of the objects of invention having been stated, other objects will appear as the description proceeds when taken in connection with the accompanying drawings, in which, FIG. 1 is a flow diagram showing the order of occurrences in my compositing process;

FIG. 3 is a sectional view taken along line 3—3 in FIG. 2, and

FIG. 4 is a fragmentary isometric view of the intake end of an air distribution cell forming a part of each bin.

Figure 1:
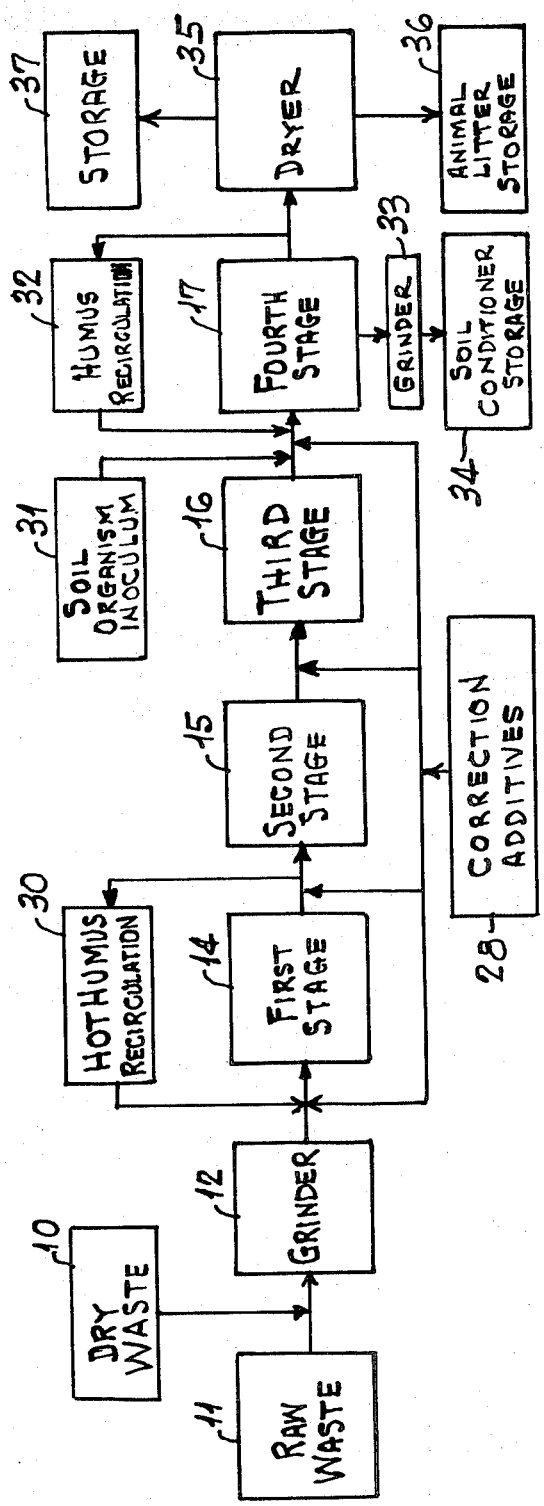

Dry organic wastes, such as peanut shells, paper refuse and sawdust, are comminuted to a particle size of about ⅛ inch by a hammermill or other conventional pulverizing mechanism to make the product more available to bacteria, and then it is conveyed into a holding bin 10 to be later fed into the main stream of raw or excessively moist wastes, such as animal manures, moving from hopper 11. The combined dry and moist wastes are transferred to grinder 12 and then to the first stage 14 of the composting process hereinafter described (FIG. 1).

Figure 2:
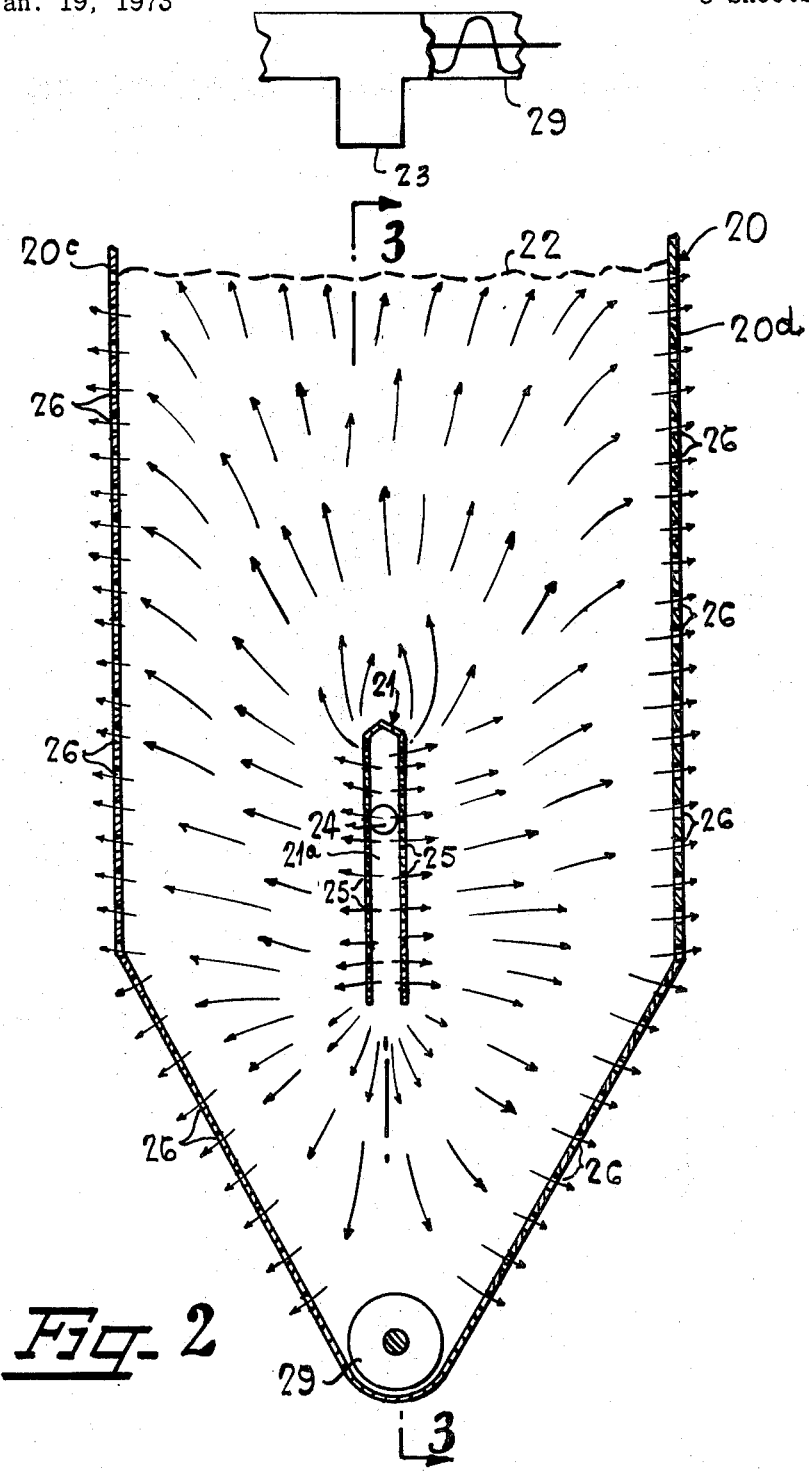
FIG. 2 is a diagrammatic cross-sectional view through a typical composting bin incorporated in each stage of the process.

The specific compositing process show and described in this application is illustrative of a basic principle and not intended to be a limiting factor. The process as shown is composed of four stages or phases designated by numerals 14, 15, 16 and 17, each of which include a bin 20 with an air cell 21 therein (FIGS. 2, 3 and 4). The cells is supported between the opposed walls 20a and 20b of the bin 20. As previously stated, the waste material first enters bin 20 of stage 14 where it is composted in a stationary mass or batch for a specified time, and then it is transferred step-by-step to the bins 20 of stages 15, 16 and 17 for subsequent treatment. The number of stages, however, may vary since the bin size depends upon the daily volume of waste to be processed. Using large bins, a small volume could be composted in two or three bins, while using small bins and large volumes of waste may require five or more bins. The number of air cells 21 in each bin depends upon the bin size and must be spaced apart so as to obtain optimum aeration of the entire bin contents. The residence time of waste in a large bin may be a week or more while in a series of small bins the time would be shorter. Accordingly, the total time for processing into stable dry humus varies from four to 16 days depending upon the above conditions and the material composted.

Air cell 21 is centrally disposed within a stationary mass or batch of waste material 22 which has been conveyed to bin 20 through discharge outlet 23 of conventional conveyor system 29, said system being employed to transfer the material from the bottom of one bin into the top of the next bin in a well-known manner. As indicated in FIGS. 2 and 3, pressurized air is forced through intake 24 and into space 21a within cell 21, from whence it escapes laterally through small uniformly and closely spaced perforations in the cell walls, after which it diffuses or percolates into the material, and finally escapes to the atmosphere through perforations 26 in the bin walls 20c and 20d and also through the open top of the bin (FIG. 2). The compartment or space 21a within cell 21 permits the air pressure therein to become equalized, and the perforations 25 in the cell walls cause the pressurized air to be discharged in the form of jets or spray at a uniform velocity at all discharge points at the interface of the air cell or space and the surrounding material. This manner of equalizing and discharging the air from the cell or space 21a produces uniform aeration of the surrounding material. The resulting diffusion or percolation of air at uniform pressure, plus the optimum positioning of the air cells within the material, allow close regulation of the amount of air flow to all parts of the composting materials and further serves as an effective temperature control.

The volume of air forced through the hot compost in bins 20 of stages 14 and 15 maintains the temperature of the composting materials below the critical maximum of about 65° C. should the temperature continue to rise substantially above this maximum, most of the mesophilic and soil bacteria would be eventually killed off, resulting in incomplete composting of the material. It should be kept in mind that the temperature ranges in composting are broad and not as specific as in chemical reactions.

DESCRIPTION OF THE PROCESS

As previously stated, moist organic wastes are continuously conveyed step-by-step through the four stages 14 through 17. When needed, comminuted dry wate is mixed with moist waste to provide the required moisture content. If the mixture is on the dry side, water may be added; and if on the acid side (that is, below pH 6.0), correction may be made by the addition of lime or calcium carbonate by a percentage feeder 28. In conveying from bin to bin, the material is automatcially tumbled and aerated by the conventional conveying system 29.

After being deposited in bin 20 of first stage 14, the most efficient way to supply oxygen to all parts of the waste is by means of forced aeration while the material is stationary. To accomplish this important function, the above-described air cells 21 are employed, each to spray and diffuse air at equalized pressures into the surrounding waste, after which it percolates and diffuses substantially uniformly to all parts of the waste mass.

If conditions are right in the first stage 14, the material will start heating within four to ten hours and finally reach a temperature of 55 to 65° C. in 24 hours, part of the heat escaping through perforations 26 in the bin side walls 20c and 20d (FIG. 2) and the remainder through the open top of the bin. An increase in bacteria growth will occur as the temperature rises. This rise and accompanying bacteria growth is sometimes referred to as a logarithmic phase (Zinsser's Microbiology, Smith, Conant & Overman, 13th ed., p. 85, Appleton, Century and Crofts, New York). As the bacteria death rate exceeds the rate of cell division in this phase, most of the available nutrients in the exposed portions of the batch of material 22 which are capable of multiplying metabolic heat-producing thermophilic and mesophilic bacteria have been utilized. At this time, the initial declining phase begins during which occurs a decrease in bacteria growth and temperature.

The retention time in the first stage 14 is usually about 48 hours, the optimum time for transfer to the second stage 15 being when the temperature begins to fall from its maximum. The retention time is determined by the amount of available nutrients and other factors such as coarseness, lignin content, and material temperature.

Before the material is transferred to stage 15, it is assayed for moisture and acidity so that correction may be made by the chemical feeder 28. Usually the pH has a tendency to drop, particularly if the material is high in soluble carbohydrates, but it can be brought back to the 7.5 to 8 range with the addition of calcium carbonate or other suitable neutralizing buffers.

The corrected semi-stabilized cmposting material of the first stage 14 is now transferred to the second stage 15. While conveyed, a part of the hot material 22 is retained in a storage bin 30 for the purpose of recycling it to inoculate the preconditioned raw waste as it moves from grinder 12 to first stage 14 of the process (FIG. 1).

The second stage treatment is substantially a repetition of the proces in the first stage because new material is usually exposed during transfer, said newly exposed material being subjected to continued composting by the metabolic heat-producing mesophilic and thermophilic bacteria during the second stage 15. The second stage treatment is also accompanied by a logarithmic phase which ends at the beginning of a second or final declining phase. The latter phase lasts for the remainder of the process and is accompanied by progressive declines in temperature and bacterial growth.

As the material 22 reaches stage 15, it should have a moisture content of 45 to 65%. After a few hours, the temperature will rise to above 50° C., during which time the air cell 21 should be employed to prevent the temperature from exceeding the maximum. If the temperature continues to rise substantially above 55° C., the volume of air should be increased accordingly.

After 24 to 72 hours in the second stage 15, the material is transferred to the third or lag stage 16 during which the temperature continues to drop to approximately the level of the surrounding environment; and the overall bacterial growth is low as compared with the first two stages. If needed, additional moisture may be supplied to the composting material at any time while being transferred from one bin to another.

After the temperature drops sufficiently during the third stage to a point near that of the surrounding environment, or at least below the thermal death point of certain soil culture inoculants later described, it is conveyed to the fourth stage 17 which is the latter part of the final stabilization phase. During the latter conveyance or transfer, the material 22 is inoculated by feeders 31 with a mixture of soil cultures containing one or more species from the three different groups described below:

Group I consists of a number of species belonging to the genus Streptomyces which are known for their production of antibiotics such as *S. griseus, S. Rinosus, S. aureofaciens,* and *S. Fradese.*

Group II consists of nitrogen-fixing bacteria of the genus Azotobacter which includes the species *A. chroccomcocum,* and Group III consists of bacteria of the genus Rhizobium which includes seven species, each associated with a particular legume, namely, (1) alfalfa group, *Rh. meliloti*; (2) clover group, *Rh. trifolii*; (3) pea group, *Rh. leguminosarum*; (4) bean group, *Rh. phaseoli*; (5) lupine group, *Rh. lupini*; (6) soy bean group, *Rh. japonicum,* and (7) cowpea group, *Rhixobium sp.*

All three groups of organisms mentioned above are soil microorganisms found in natural humus. The bacteria being used to inoculate is dependent upon the particular type of variation in that it is aerobic bacteria and therefore needs air in the right amounts, as well as optimum temperature control. Also, the material must be previously conditioned (composted) to the extent that the thermophilic bacteria are no longer active.

As the material is transferred from stage 16 to stage 17, it may also be inoculated with the previously inoculated stabilized completed humus from the end of the fourth stage 17, said humus inoculant being retained in storage bin 32 for the purpose of recycling into the material at the beginning of the last stage. Completed humus for recycled inoculation has as an integral part thereof the previously described soil cultures selected from Groups I, II and III, said recycled inoculant serving to initiate the final phase of stabilization more quickly. The amount of the inoculant used in recycling can vary from 5 to 25%.

It is understood by those skilled in the art of fermentation that a rich inoculum up to 10% or more produces better results and reduces chance of contamination. Recycling a higher percentage of stable humus would produce a more stable humus, that is, the material would be more completely exhausted. As shown by Block, S. S., Garbage Composting for Mushroom Production, Appl. Microbiology 13, 5–9 (1965), a complete stable humus is necessary for mushroom growth but not essential for other plants. Hence, recycling a high percent assures the operator of a completely stable humus if he is making the humus for mushroom growers.

It is important to observe that the present process builds antibiotic factors and nitrogen-fixing bacteria into the humus during stabilization, as contrasted with the practice of adding them to completed humus; or as contrasted with the practice of using them as process additives where subsequent temperatures are so high that few, if any, survive and remain as product additives. By the present process, the soil organisms become an integral an permanent part of the humus, while merely adding these beneficial organisms in sufficient amounts to bring them up to the same level attained through growth by recycling would be too expensive and impractical. By growing a high concentration of the desired types in the final phase, the dry humus when used as a litter will help prevent disease bacteria from developing.

The same principle can be applied to nitrogen-fixing bacteria of the soil, the principle groups being Azotobacter and Rhizobium. The Azotobacter group fixes nitrogen directly from the air while it is growing in nodules on the roots of plants. By inoculation and recycling while the humus is developing, these organisms can be built up to a high concentration.

The thermal death point, that is, the point at which the bacteria would be killed in ten minutes, of these beneficial nitrogen-fixing soil bacteria is approximately 60–62° C., and somewhat lower temperatures (down to 50° C.) are said to attenuate these bacteria and keep them from multiplying (See Breed, Murray & Smith, 1957 ed., Bergey's Manual of Determinative Bacteriology, pp. 283–288, Williams & Wilkins, Baltimore, Md.; Frazer, W. C., Food Microbiology, pp. 87–92, McGraw-Hill, New York; Society of American Bacteriologists, 1957, Manual of Microbiological Methods, pp. 141–168 and 106–115, McGraw-Hill, New York; Waksman, S. A., 1952, Soil Microbiology, p. 219, John Wiley & Sons, New York; Mishustin & Shil'nokova, Biological Fixation of Atmospheric Nitrogen, 1971, p. 202, The Pennsylvania State University Press, University Park, Penn & London.

Furthermore, Bergey's manual states the temperature for optimum growth of these soil cultures is in the 25–30° C. range. Therefore, inoculating these cultures at temperatures above this range are less effective in growing the bacteria to relatively high concentrations (that is, in tens of millions of bacteria per gram or higher), and of course at still higher temperatures approaching the thermal death point at or above would not only attenuate the growth but kill the cultures.

The critical temperature limits for introducing the soil inoculants are approximately from 15 to 46° C. Temperatures over 45° C. seem to attenuate the cultures, and when below 15° C., multiplication practically ceases. If these cultures are inoculated at the upper limit of their temperature range of existence, and subsequently the temperature declines through their optimum temperature range of 25–30° C. to a few degrees below this optimum, the cultures will multiply to high concentrations, especially while declining through the optimum range.

Actinomyces and Streptomyces, according to Bergey's manual, are also bacteria which grow in the same mesophilic range as do Rhizobium and Azotobacter; and most of the temperature requirements are very similar to the last-named cultures, but the process temperatures are more critical for growth. When the temperatures are governed to allow these latter groups to grow, Streptomyces will grow in substantially the same manner.

In order to demonstrate a point at which nitrogen-fixing organisms could be most effectively introduced into the composting material, the experiment described below was executed and evaluated. A mixture of extracted tea leaves and peanut shells was being processed into humus in accordance with the method outlined above. The temperature within stage 14, stage 15, and the initial part of stage 16 reached 65-66° C., and declined to 33° C. during the final part of stage 16 before the material was transferred into the stage 17 bin.

In addition to the normal procedure outlined above, this trial composting material was inoculated prior to entering stage 14 with 5% mixed beneficial nitrogen-fixing soil organisms from natural sources. The initial concentration of these soil organisms may be seen in Table I below. This step was taken to show what happens to soil bacteria which may be added before the hot composting stages where temperatures range as high or higher than the thermal death point.

While the composting material was being transferred from the stage 16 bin, a representative sample was taken prior to inoculation with any additional soil cultures. This sample was labelled Sample #3. After this sample was taken and while the material was being transferred to the stage 17 bin, it was inoculated with 0.1% of a culture of nitrogen-fixing organisms composed of those varieties mentioned earlier. After two days of composting in this stage, a sample of this material was taken and labelled Sample #4. As the completed humus was discharged from the stage 17 bin, a portion of this humus was recycled into a fresh lot of humus treated the same as the first lot at a point immediately preceding its fourth stage 17 of composting. The amount recycled made up approximately 5% of this humus entering the stage 17 bin. In addition to the recycled humus, 0.1% culture inoculum was added as in the first lot above. This second lot of material was composted for two days. At the end of this time, again a composite sample was taken, and this was labelled Sample 4R.

All samples were refrigerated at 4° C. until time of assay. An assay of concentrations and types of organisms in the samples was made according to the standard microbiological methods of analysis and Bergey's Manual of Determinative Bacteriology. The results are enumerated in the table below.

TABLE I

| Sample and stage number | Rhizobium spp., millions/gram | Azotobacter spp., millions/gram |
|---|---|---|
| Before composting | 75 | 125 |
| Sample: | | |
| #3 | <1 | 1.5 |
| #4 | 1,500 | 1,300 |
| #4R | 8,500 | 4,100 |

It is obvious from these test results that normal composting temperatures reached in the first two stages are sufficient to attenuate and kill most beneficial nitrogen-fixing organisms. The assays show that by inoculating in a stage after available nutrients have been utilized by thermophilic bacteria and the material cooled to a point below the thermal death point of said nitrogen-fixing organisms, that they can grow to much higher concentrations and so become an integral part of the final humus. The experiment also demonstrates that the recycling operation from the end of the final stage to the aforementioned critical point in the process, once these organisms have been initially inoculated into the humus, allows the beneficial organisms to grow to a concentration of the highest level.

It can be seen that composting temperatures, initial inoculum and the final recycling step are critical to obtain optimal results with the aforementioned organisms. Even without the final recycling step, a dramatic increase in the organisms occurs as contrasted with the organisms present before composting. In other words, the Rhizobium count increases from 75 to 1500 and the Azotobacter count from 125 to 1300 as indicated by Sample #4.

Specific types of nitrogen-fixing bacteria can be used for particular types of crops. To obtain bacteria that would be adapted for a particular application for legumes, a generous sample of soil on which the particular legume is growing is obtained. This is then mixed with a pure culture and inoculated into the humus. The mixture can be additionally supplemented with pure broth cultures.

As previously stated, the principal source of many antibiotics in the world today is produced by soil microorganisms belonging to the family of Streptomycetaceae. Antibiotics such as Streptomycin, Terramycin and Aureomycin belong to this family. The Streptomyces are usually found in arable soils. The average soil and humus contains few Streptomyces, and most of these have a low antibiotic potency. Since a soil humus is the natural habitat of Streptomyces, it is possible to increase the numbers of desirable types to a high concentration in a developing humus by inoculation and recycling.

After the material is treated in the above-described manner, it may be further processed as follows:

(1) Part or all of the humus can be reground to be used as a soil conditioner;

(2) Part may be recycled for use in the process as mentioned above;

(3) Part or all can be dried by any conventional means and used as a litter for animal pens, or (4) Part or all can be transferred to wind rows or piles for storage and stabilization for any other uses.

I claim:

1. A continuous process of converting into humus organic waste material having a moisture content ranging between 40 and 70%, comprising the steps of:

(a) composting a stationary batch of said mateiral at temperatures not exceeding 65° C. until most of the available nutrients for multiplying metabolic heat-producing thremophilic and mesophilic bacteria have been utilized to initiate a continuing declining phase accompanied by receding temperatures, reduction in the rate of cell division, and an increase in the cell death rate, whereby partial stabilization is effected said composting including the steps of forming a centrally disposed air space within and surrounded by said stationary batch of materials, maintaining air pressure in said space thereby diffusing the air at said pressure from said air space into the material whereby oxygen is supplied for areobic composting and the temperature is maintained below 65° C.;

(b) continuing the composting until the temperatures of said batch have declined to between 15 and 46° C.;

(c) inoculating from an outside source the partially stabilized batch of material with soil cultures selected from the group consisting of Streptomyces, Azotobacter and Rhizobium, and then (d) completing the composting and stabilization of said inoculated material to cause the inoculant to grow to relatively high concentrations and become an integral part of a completed humus.

2. The process as defined in claim 1 and comprising the further step of recycling a portion of the inoculated stabilized completed humus into the partially stabilized material at 15 to 46° C. and during the final stabilization thereof.

3. The process as defined in claim 2 wherein the portion of recycled completed humus ranges between 5 and 25% of the completed humus.

4. The process as defined in claim 3 comprising recycling the inoculated stabilized completed humus into the partially stabilized material at temperatures ranging from 25 to 30° C.

5. The process as defined in claim 1 comprising recycling the inoculated stabilized completed humus into the partially stabilized material at temperatures ranging from 25 to 30° C.

References Cited
UNITED STATES PATENTS

| | | | |
|---|---|---|---|
| 2,820,703 | 1/1958 | Dressen et al. | 71—9 |
| 3,142,557 | 7/1964 | MacDulhie et al. | 71—9 |
| 2,337,686 | 12/1943 | Sherman | 71—8 |
| 3,314,765 | 4/1967 | Abson et al. | 71—9 X |
| 3,055,744 | 9/1962 | Peterson | 71—9 X |
| 2,867,521 | 1/1959 | Letheys | 71—9 X |

SAMIH N. ZAHARNA, Primary Examiner

R. BARNES, Assistant Examiner